(12) United States Patent
Juzswik (10) Patent No.: US 10,252,584 B2
(45) Date of Patent: *Apr. 9, 2019

(54) TIRE FILL ASSIST METHOD AND APPARATUS (71) Applicant: TRW AUTOMOTIVE U.S. LLC, Livonia, MI (US)

(72) Inventor: David Leonard Juzswik, Commerce Township, MI (US)

(73) Assignee: TRW AUTOMOTIVE U.S. LLC, Livonia, MI (US)

(*) Notice: Subject to any disclaimer, the term of this patent is extended or adjusted under 35 U.S.C. 154(b) by 135 days.

This patent is subject to a terminal disclaimer.

(21) Appl. No.: 14/971,281

(22) Filed: Dec. 16, 2015

(65) Prior Publication Data

US 2016/0167462 A1 Jun. 16, 2016

Related U.S. Application Data (60) Provisional application No. 62/092,323, filed on Dec. 16, 2014.

(51) Int. Cl.
B60C 23/00 (2006.01)
B60C 23/04 (2006.01)

(52) U.S. Cl.
CPC ...... *B60C 23/0484* (2013.01); *B60C 23/0406* (2013.01)

(58) Field of Classification Search
None
See application file for complete search history.

(56) References Cited

U.S. PATENT DOCUMENTS

| 4,916,943 | A | * | 4/1990 | Himmler | G01M 17/021 141/4 |
| 5,517,853 | A |  | 5/1996 | Chamussy | |
| 6,401,743 | B1 |  | 6/2002 | Naedler | |
| 6,472,979 | B2 |  | 10/2002 | Schofield et al. | |
| 6,612,165 | B2 |  | 9/2003 | Juzswik et al. | |
| 6,630,885 | B2 |  | 10/2003 | Hardrnann et al. | |
| 6,658,928 | B1 |  | 12/2003 | Pollack et al. | |
| 6,774,774 | B2 |  | 8/2004 | Schofield et al. | |
| 6,778,075 | B2 |  | 8/2004 | Headley et al. | |
| 6,868,358 | B2 |  | 3/2005 | Brown, Jr. | |
| 6,879,252 | B2 |  | 4/2005 | DeZorzi et al. | |

(Continued)

FOREIGN PATENT DOCUMENTS

| CN | 203438786 | 2/2017 |
| JP | 2004058998 | 2/2004 |

(Continued)

*Primary Examiner* — Andre Allen
(74) *Attorney, Agent, or Firm* — Tarolli, Sundheim, Covell & Tummino LLP (57) ABSTRACT A tire condition monitoring apparatus includes a tire-based sensor configured to sense tire operating conditions and transmit a tire condition signal including the sensed tire operating conditions. The apparatus also includes a vehicle-based controller configured to receive the tire condition signal and monitor the tire operating conditions. At least one of the sensor and the controller are configured to determine that a tire pressure adjustment condition exists in response to determining, based on the sensed operating conditions, that a predetermined change in the number of moles of air in the tire has taken place.

27 Claims, 4 Drawing Sheets (56) References Cited

U.S. PATENT DOCUMENTS

| | | | |
|---|---|---|---|
| 6,938,467 | B2 | 9/2005 | Tsujita |
| 6,997,048 | B2 | 2/2006 | Komatsu et al. |
| 7,216,532 | B2 | 5/2007 | Rimkus et al. |
| 7,218,209 | B2 | 5/2007 | Utter et al. |
| 7,242,285 | B2 | 7/2007 | Shaw |
| 7,289,930 | B2 | 10/2007 | Stolzl et al. |
| 7,323,975 | B2 | 1/2008 | Hall et al. |
| 7,528,705 | B2 | 5/2009 | Brown, Jr. et al. |
| 7,948,364 | B2 | 5/2011 | Lin et al. |
| 8,525,657 | B2 | 9/2013 | Patel et al. |
| 8,818,619 | B2 * | 8/2014 | Juzswik ................ B60C 23/02 701/32.9 |
| 8,854,200 | B2 | 10/2014 | Patel et al. |
| 8,909,420 | B2 | 12/2014 | Kuchler et al. |
| 9,162,541 | B2 | 10/2015 | Reynes |
| 2004/0017289 | A1 | 1/2004 | Brown, Jr. |
| 2006/0220813 | A1 | 10/2006 | Utter et al. |
| 2006/0232390 | A1 | 10/2006 | Hall et al. |
| 2006/0235652 | A1 * | 10/2006 | Rimkus ............. B60C 23/0476 702/183 |
| 2011/0205047 | A1 | 8/2011 | Patel et al. |
| 2012/0044064 | A1 | 2/2012 | Maekawa et al. |
| 2013/0125639 | A1 * | 5/2013 | Lemineur ............. B60C 23/04 73/146 |
| 2013/0238188 | A1 | 9/2013 | Obradovich et al. |
| 2015/0059462 | A1 * | 3/2015 | Peinelt .................. B60C 23/04 73/146.8 |
| 2017/0130797 | A1 * | 5/2017 | Fazeli ................. F16F 9/3271 |

FOREIGN PATENT DOCUMENTS

| | | | |
|---|---|---|---|
| KR | 2013-0130983 | 12/2013 | |
| KR | 10-145832 | 11/2014 | |
| WO | WO 2014182979 A2 * | 11/2014 | ......... B60C 23/0401 |

* cited by examiner

TIRE FILL ASSIST METHOD AND APPARATUS

RELATED APPLICATION

This application claims the benefit of Juzswik U.S. Provisional Patent Application No. 62/092,323 entitled TIRE FILL ASSIST METHOD AND APPARATUS, with a filing date of Dec. 16, 2014, the subject matter of which is hereby incorporated by reference in its entirety.

FIELD OF THE INVENTION

The present invention is related to a tire fill assist method and apparatus that aids a driver in inflating/deflating vehicle tires.

BACKGROUND

Tire condition monitoring systems are known. By helping vehicle operators maintain vehicle tires at a proper inflation pressure, tire condition monitoring systems enhance vehicle safety, help reduce tire wear, and help reduce $CO_2$ emissions as vehicles run more efficiently with properly inflated tires. Known tire condition monitoring systems may include tire-based sensors mounted on the inside of the tire (e.g., attached to the tire rim) for measuring tire conditions such as temperature and pressure. A tire-based transmitter operatively coupled to the tire-based sensor transmits a radio signal to a vehicle-based receiver unit. The transmitted signal may include both temperature and pressure information along with a unique sensor identification code that can serve as a tire identification code. The vehicle-based receiver unit monitors the tire condition signals, the received tire identification code, and controls a display device within the vehicle cabin to warn the vehicle operator when the sensed tire condition(s) are not within predetermined limits. The vehicle-based receiver unit can further indicate which tire location has an out-of-limit tire condition (e.g., overpressure or under-pressure) by associating the tire location with the received tire condition signals using the unique tire identification code.

Certain regulations have been proposed for tire pressure monitoring systems (e.g., by the United Nations Economic Commission for Europe ("UNECE") Transportation Division and, in particular, regulation EC R64.02) applicable to certain classes of vehicles. These regulations require that the tire pressure monitoring system must provide a warning to the vehicle operator upon a predetermined percentage pressure loss (e.g., 20% pressure loss) within any one of the vehicle's tires. Since tire pressure is dependent on temperature, detection of a percentage pressure loss can prove difficult. In certain geographic area of the world, it is possible to have a large percentage variation of tire pressure simply due to ambient temperature variations particularly when combined with tire temperature increases during use. The four major factors that influence tire pressure are tire temperature, ambient temperature, ambient atmospheric pressure, and vehicle load conditions. Tire temperature varies during use, ambient temperatures vary over time and location, ambient atmospheric pressure varies according to altitude and weather, and vehicle load varies under use conditions. It is difficult to establish a cold tire pressure value during normal vehicle operation particularly when a vehicle operator inflates a hot tire to a recommended pressure value.

Some proposed systems automatically initiate a tire fill assist operation in response to a change of tire pressure when the vehicle is stationary. A problem occurs when a pressure change (e.g., pressure increase), occurs due to heating of the tire as a result of, for example, a hot disc rotor or running vehicle engine. In such a case, a pressure measurement could be potentially misleading due to temperature fluctuations. Since such tire fill assist systems may use audible and/or visual feedback for the vehicle operator, and improper initiation of the tire assist system could cause operator confusion.

In response to this, some tire condition monitoring systems implement the ideal gas law to detect pressure increases or decreases by monitoring the number of moles or mass of the air in the tire. The ideal gas law is $PV=nRT$, where P is pressure, V is volume, n is the number of moles, R is the ideal gas constant for the gas in question, and T is temperature. Assuming the volume of the tire to be constant, V and R can be ignored as constants and the equation reduces to $n=P/T$. Thus, using this simplified equation, the number of moles of air (n) in a tire can be monitored as being functionally related to the measured pressure (P) and temperature (T) information received from the TCM sensor. Examples of such systems are disclosed in Juzswik U.S. Pat. No. 6,612,165 entitled TIRE PRESSURE MONITORING SYSTEM WITH PRESSURE GAUGE OPERATING MODE FOR INDICATING WHEN AIR PRESSURE WITHIN A TIRE IS WITHIN A PREDETERMINED PRESSURE RANGE, issued Sep. 2, 2003, and Juzswik U.S. Pat. No. 8,818,619 entitled METHOD AND APPARATUS FOR DETERMINING TIRE CONDITION USING IDEAL GAS LAW, issued Aug. 26, 2014. The disclosures of both of these Patents are hereby incorporated by reference in their entireties.

SUMMARY OF THE INVENTION

According to one aspect of the invention, the tire fill assist mode of a tire condition monitoring system is initiated in response to a predetermined change in the number of moles of air in the tire, under certain vehicle conditions.

According to another aspect of the invention, tire pressure and temperature are known from a tire condition sensor that forms part of a tire condition monitoring system (TCMS). Relying upon a simplified form of the Ideal Gas Law, the change in the number of moles of air (as opposed to a pressure change) within the tire can be determined as being functionally related to a difference between current and stored pressures and temperatures. In response to the mole number change, the tire fill assist mode can be initiated.

According to one aspect, a tire condition monitoring apparatus includes a tire-based sensor configured to sense tire operating conditions and transmit a tire condition signal including the sensed tire operating conditions. The apparatus also includes a vehicle-based controller configured to receive the tire condition signal and monitor the tire operating conditions. At least one of the sensor and the controller are configured to determine that a tire pressure adjustment condition exists in response to determining, based on the sensed operating conditions, that a predetermined change in the number of moles of air in the tire has taken place.

According to another aspect, the tire operating conditions in the transmitted tire condition signal can include the sensed pressure and temperature of the air in the tire.

According to another aspect, the controller can be configured to enter a tire fill assist mode in response to determining that a tire pressure adjustment condition exists.

According to another aspect, the controller, when in the tire fill assist mode, can be configured to provide at least one of visual and audible alerts indicating at least one of the following conditions: that the controller is in the tire fill assist mode, that tire pressure is less than a predetermined pressure, that tire pressure is equal to the predetermined pressure, and that tire pressure exceeds the predetermined pressure.

According to another aspect, the predetermined pressure can be a vehicle placard pressure determined by the vehicle manufacturer.

According to another aspect, the alerts can include at least one of a vehicle horn chirp, a vehicle light flash, a vehicle instrument panel indication, and a vehicle center console indication.

According to another aspect, the sensor can be configured to measure pressure in the tire and enter a tire fill request mode in response to determining a predetermined change in the measured pressure within a predetermined time.

According to another aspect, the sensor can be configured to measure pressure in the tire and enter a tire fill request mode in response to determining a predetermined change in the measured pressure since the last transmitted pressure value.

According to another aspect, the predetermined change in pressure can be +/−0.8-1.2 psi and the predetermined time can be 1-3 seconds.

According to another aspect, the sensor can be configured to include in the tire condition signal a tire fill request and the controller can be configured to determine whether the change in the number of moles of air has occurred in response to receiving a tire condition message that includes the tire fill request indication.

According to another aspect, the sensor can be configured to determine whether the pressure adjustment condition exists.

According to another aspect, the determination that a tire pressure adjustment condition exists can be blocked unless predetermined vehicle conditions exist. The vehicle conditions can include: the vehicle being stopped, the vehicle ignition being on, the vehicle transmission being in park in the case of an automatic transmission, and the vehicle parking brake being engaged in the case of a manual transmission.

According to another aspect, the determination that a predetermined change in the number of moles of air in the tire has taken place can be functionally related to:

$$\frac{P_{stored}}{T_{stored}} - \frac{P_{meas}}{T_{meas}},$$

where $P_{stored}$ is a previously stored tire air pressure, $T_{stored}$ is a previously stored tire air temperature, $P_{meas}$ is the sensed pressure of the air in the tire, and $T_{meas}$ is the sensed temperature of the air in the tire previously stored tire air temperature.

According to another aspect, a method for monitoring vehicle tire conditions with a tire condition monitoring system including a tire-based sensor and a vehicle based controller can include sensing, via the sensor, tire operating conditions. The method can also include transmitting, via the sensor, a signal including the sensed tire operating conditions and receiving the signal via the controller. The method can also include determining that a tire pressure adjustment condition exists in response to determining, based on the sensed operating conditions, that a predetermined change in the number of moles of air in the tire has taken place.

According to another aspect, the tire conditions in the transmitted signal can include the sensed pressure and temperature of the air in the tire.

According to another aspect, the method can also include the step of the controller entering a tire fill assist mode in response to the determination that a tire pressure adjustment condition exists.

According to another aspect, the method can also include providing at least one of visual and audible alerts via the controller when in the tire fill assist mode. The at least one of visual and audible alerts can indicate that the controller is in the tire fill assist mode, that tire pressure is less than a predetermined pressure, that tire pressure is equal to the predetermined pressure, or that tire pressure exceeds the predetermined pressure.

According to another aspect, the predetermined pressure can be a vehicle placard pressure determined by the vehicle manufacturer.

According to another aspect, the at least one of a visual and audible alerts can include at least one of a vehicle horn chirp, a vehicle light flash, a vehicle instrument panel indication, and a vehicle center console indication.

According to another aspect, the method can also include measuring, via the sensor, a pressure in the tire. The sensor can be configured to enter a tire fill request mode in response to determining a predetermined change in the measured pressure since the last transmitted value.

According to another aspect, the method can also include measuring via the sensor a pressure in the tire. The sensor can be configured to enter a tire fill request mode in response to determining a predetermined change in the measured pressure within a predetermined time.

According to another aspect, the predetermined change in pressure can be +/−0.8-2.0 psi and the predetermined time can be 1-3 seconds.

According to another aspect, the sensor can be configured to include in the tire condition signal a tire fill request. The method can include determining via the controller whether the change in the number of moles of air has occurred in response to receiving a tire condition message that includes the tire fill request.

According to another aspect, determining that a tire pressure adjustment condition exists can be predicated on determining that predetermined vehicle conditions exist. The vehicle conditions can include the vehicle being stopped, the vehicle ignition being on, the vehicle transmission being in park in the case of an automatic transmission, and the vehicle parking brake being engaged in the case of a manual transmission.

According to another aspect, determining the change in the number of moles can include making a determination in which the number of moles is functionally related to:

$$\frac{P_{stored}}{T_{stored}} - \frac{P_{meas}}{T_{meas}},$$

where $P_{stored}$ is a previously stored tire air pressure, $T_{stored}$ is a previously stored tire air temperature, $P_{meas}$ is the sensed pressure of the air in the tire, and $T_{meas}$ is the sensed temperature of the air in the tire previously stored tire air temperature.

According to another aspect, determining whether the pressure adjustment condition exists can be performed by the sensor.

According to another aspect, determining whether the pressure adjustment condition exists can be performed by the controller.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION

Figure 1:
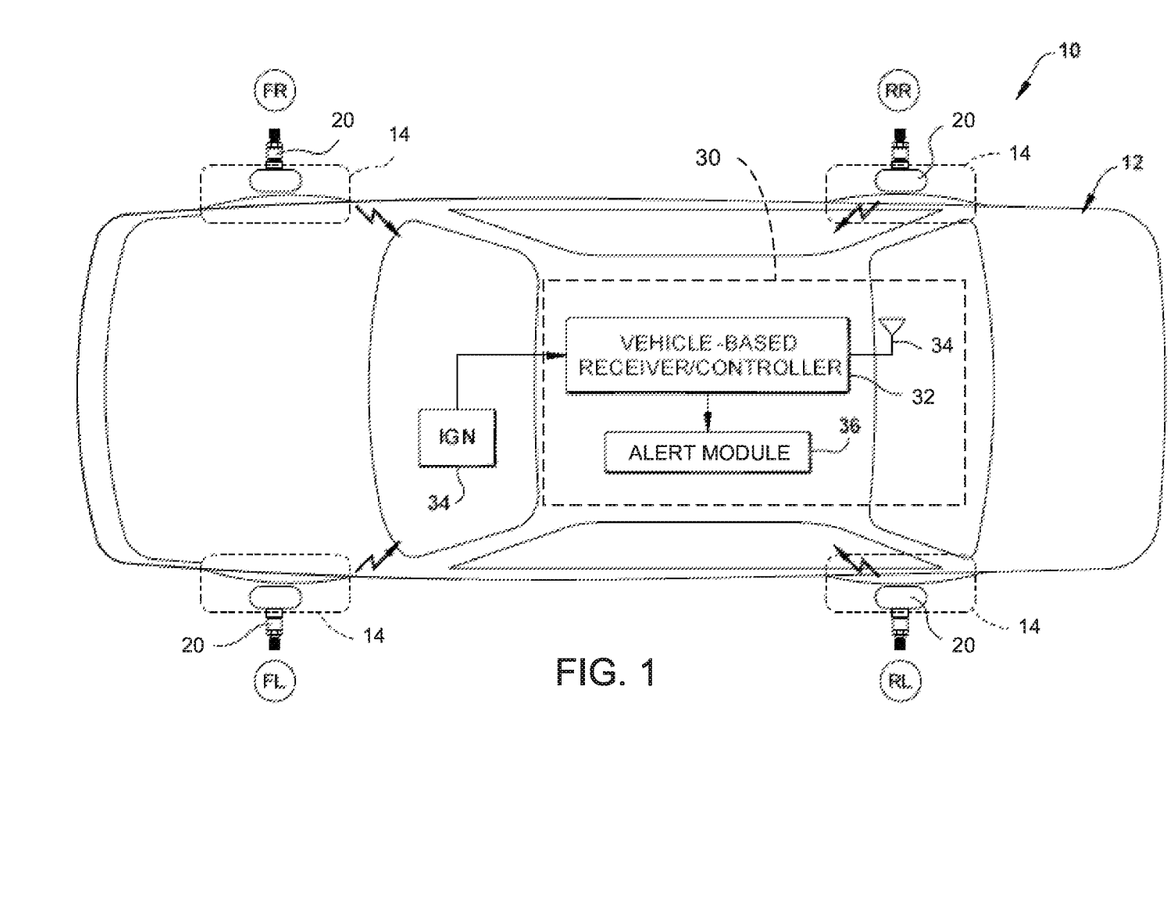
FIG. 1 is a schematic diagram of a vehicle including a tire condition monitoring system according to one example embodiment of the invention.

FIG. 1 illustrates a vehicle 12 including a tire condition monitoring (TCM) system 10, according to one example embodiment of the present invention. The TCM system 10 can also be referred to as a tire pressure monitoring (TPM) system. The TCM designation of the system 10 and components thereof will be maintained in this description for consistency, with the understanding that the TCM/TPM designations are interchangeable and that the use of either designation for the system or its components neither adds to nor detracts from their respective functionalities or capabilities.

The TCM system 10 is designed to measure and monitor tire operating conditions, including pressure and temperature, and to provide indication to the vehicle operator when certain conditions relating to the vehicle tires exist. For example, the TCM system 10 can provide a tire low pressure alert when inflation pressure falls below a predetermined value or a tire high pressure alert when inflation pressure exceeds a predetermined value. According to one aspect of the invention, the TCM system 10 can also assist a vehicle operator when inflating or deflating the tires, as described in further detail below.

Referring to FIG. 1, the vehicle 12 includes four tires 14 located at the front right (FR) corner of the vehicle, the front left (FL) corner of the vehicle, the rear right (RR) corner of the vehicle, and the rear left (RL) corner of the vehicle, respectively. Each tire 14 has an associated tire condition monitoring (TCM) sensor 20 that is mounted to the wheel of its associated tire in a known manner. The TPM sensors 20 are wheel-based components of the TCM system 10. The TCM sensor 20 can also be referred to as a tire pressure monitoring (TPM) sensor (see above explanation regarding the equivalence of the TCM/TPM designations).

Each TCM sensor 20 includes an associated pressure sensor/transducer and a temperature sensor/transducer for sensing its tire's associated pressure and temperature, respectively. Each TCM sensor 20 can also include an accelerometer that operates to measure movement of the sensor to determine, e.g., whether the vehicle is in motion. Each TCM sensor 20 further includes a radio transmitter (not shown) for transmitting a wireless tire condition signal. The transmitted signal from each TCM sensor 20 may be in the form of a digital code modulation format such as amplitude shift key (ASK), frequency shift key (FSK), etc., carried on a radio frequency (RF) signal, known in the art as a carrier frequency.

The tire condition signal transmitted from each TCM sensor 20 is typically a coded signal including the sensed pressure and temperature information for the associated tire 14 along with unique TCM sensor transmitter identification (ID) information. Since each TCM sensor 20 unit has an associated transmitter ID and each TCM sensor unit is associated with a single tire, the transmitter ID can also serve as and be referred to herein as the tire ID.

The TCM system 10 also includes one or more vehicle-based components 30 for receiving and processing the signals from each TCM sensor 20. The vehicle-based TCM components 30 can, for example, include a TCM receiver/controller 32 (hereafter TCM controller) and a vehicle alert module 36 for providing audible and/or visual alerts to the vehicle operator. The TCM controller 32 includes an antenna 34 for receiving the signals from the TCM sensors 20. The TCM controller 32 can, for example, include an ECU comprising a microcomputer, a microprocessor along with necessary peripheral circuitry, discrete circuitry designed to perform the needed functions of the control process, or an application specific integrated circuit ("ASIC") designed to perform the specific functions of the present invention.

Figure 2:
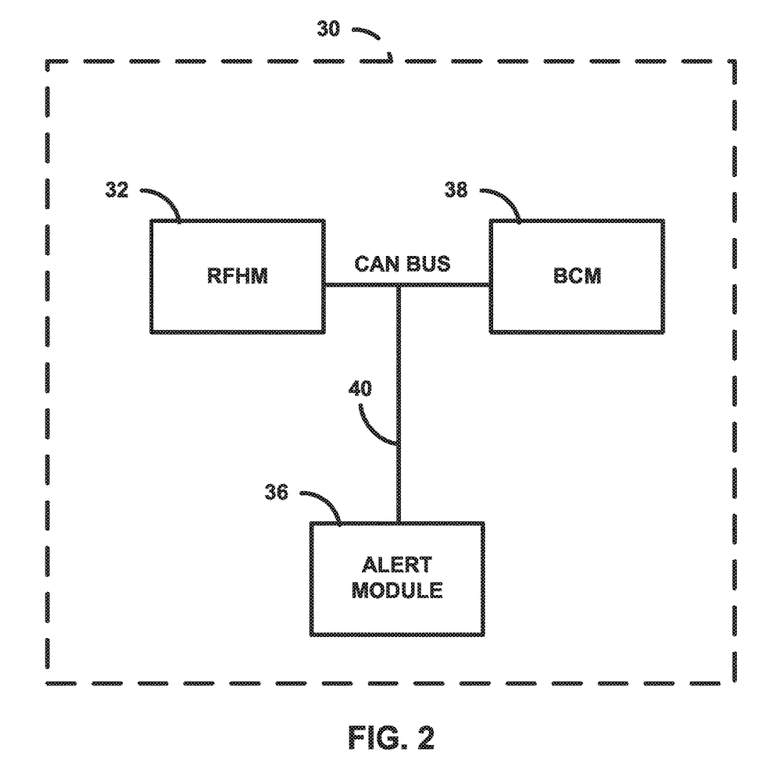
FIG. 2 is a schematic diagram of a portion of the tire condition monitoring system of FIG. 1, according to one example embodiment of the invention.

Because vehicle system configurations and architectures can vary, the TCM system 10 is illustrated schematically in FIG. 1. However, one specific configuration of the vehicle based TCM components 30 that can be implemented is illustrated in FIG. 2. In this configuration, the TCM controller 32 is a radio frequency hub module (RFHM) that can receive and process wireless signals from the TCM sensors 20 and other wireless vehicle systems, such as vehicle security/anti-theft systems, and keyless ignition systems. The RFHM 32 communicates with a vehicle control module 38, commonly referred to as a body control module (BCM) via a vehicle controller area network or CAN bus 40. The RFHM 32 and/or the BCM 38 can also communicate via the CAN bus 40 with the vehicle alert module 36, which can be in the form of vehicle instrumentation (e.g., the instrument cluster), an information console display, a vehicle horn, a security chirp device, vehicle lights, or a combination thereof.

The TCM controller 32 is configured to monitor one or more vehicle conditions, such as the state of the vehicle ignition, i.e., ON or OFF, whether the vehicle transmission is in PARK, whether the parking brake is engaged, vehicle speed, etc. In response to the received pressure and temperature information from the TCM sensors 22, the TCM controller 32 controls the vehicle alert module 36, in order to provide tire condition information to the vehicle operator. Since each TCM sensor 20 has a unique ID, the TCM controller 32 can associate the signals received from each TCM sensor with the associated tire location on the vehicle and thereby provide an indication as to which tire the tire condition information pertains.

The TCM system 10 is operative to monitor the operating conditions of the tires 14 as determined from the data received from the TCM sensors 20. These conditions can, for example, include tire inflation pressure, temperature, and whether the tire is in motion. Based on the monitored conditions, the TCM system 10 can provide information/alerts to the vehicle operator, such as the current inflation pressure of the tires or an alert that one or more of the tires has a low pressure condition. The TCM system 10 can implement this functionality in any known manner, such as those set forth in the above-mentioned U.S. Pat. Nos. 6,612,165 and 8,818,619.

According to one aspect of the invention, the TCM system 10 can also determine when the vehicle operator performs a pressure adjustment, i.e., inflates or deflates, the vehicle tires. In response to determining a tire pressure adjustment, the TCM system 10 can enter an assist mode and assist the vehicle operator in the inflation or deflation process by indicating to the operator that proper inflation pressure has not yet been reached, has been reached, and has been exceeded.

Since the overwhelming majority of these pressure adjustment events are inflation events as opposed to deflation events, the term "tire fill" is used to describe this condition. This term is not meant to limit the system to tire inflation events only, but instead to indicate that the operator is performing any pressure adjustment to the tire, whether by adding or removing air. In response to detecting a tire fill condition, the TCM system 10 can enter a tire fill assist (TFA) mode where the TCM system provides indications and/or feedback that assists the vehicle operator in making the tire pressure adjustment.

TCM Sensor TFA Operation

The TCM sensors can operate in a variety of manners to sense or measure tire conditions and transmit data related to those conditions. By way of example, in one configuration, the TCM sensor 20 can operate in four primary modes: a PARK mode, a LOCALIZE mode, a DRIVE mode, and an INTERIM mode. The PARK and INTERIM modes occur only when the TCM sensor 20 detects that the vehicle is stopped (i.e., motion=0). The LOCALIZE and DRIVE modes occur only when the TCM sensor 20 detects that the vehicle is moving (i.e., motion=1).

In each mode, the TCM sensor 20 can measure and transmit the sensed tire operating conditions at predetermined rates. For example, some rates at which the TCM sensor 20 can be configured to perform some of these measurements and transmissions in the different operating modes are illustrated in Table 1:

TABLE 1

| | |
|---|---|
| PARK Mode | Measure Rate:<br>Pressure - Every 2 sec<br>Temperature - on RF transmit.<br>RF Transmit: Change in pressure >1.2 psi since last TX. |
| LOCALIZE Mode | Measure Rate:<br>Pressure - Every 16-36 seconds.<br>Temperature - Every 16-36 seconds.<br>RF Transmit: Every 16-36 seconds. |
| DRIVE Mode | Measure Rate:<br>Pressure - Every 16 seconds.<br>Temperature - Every 16 seconds.<br>RF Transmit: Change in pressure >1.2 psi since last TX or 64 seconds |
| INTERIM Mode | Measure Rate:<br>Pressure - Every 2 seconds.<br>Temperature - on RF transmit.<br>RF Transmit: Change in pressure >1.2 psi since last TX. |

In operation, the TCM sensor 20 initializes to the PARK mode. From the PARK mode, the sensor 20 and enters the LOCALIZE mode upon vehicle motion. In the LOCALIZE mode, the TCM sensor 20 transmits data to the TCM controller 32 that the controller uses to determine the tire position (i.e., FL, FR, RL, RR, see FIG. 1) associated with each sensor. For example, the TCM controller 32 can determine the position of the TCM sensors 20 on the vehicle by using the data received from the TCM sensor 20 (e.g., sensor ID, motion detected, LOCALIZE mode) and other vehicle information, such as wheel rotation information from a vehicle anti-lock brakes (ABS) system.

The LOCALIZE mode can be implemented in any known manner. Examples of tire location identification methods that can be implemented in the LOCALIZE mode are disclosed in Juzswik U.S. Pat. No. 6,879,252, entitled METHOD AND APPARATUS FOR ASSOCIATING TIRES WITH TIRE LOCATIONS OF A VEHICLE and Juzswik U.S. Pat. No. 7,948,364 B2, entitled, METHOD AND APPARATUS FOR DETERMINING IDENTIFIABLE TIRE POSITION LOCATION IN A TIRE PRESSURE MONITORING SYSTEM, the disclosures of which are hereby incorporated by reference in their entireties.

Once the LOCALIZE mode is completed or times out, and while the vehicle is in motion, the TCM sensors 20 enter the DRIVE MODE, where they remain until the vehicle comes to a stop. When the vehicle is in motion, and therefore in either the DRIVE or LOCALIZE mode and comes to a stop, the TCM sensor 20 enters the INTERIM mode. The TCM sensor 20 enters the PARK mode when the vehicle is stopped (Motion=0) for an uninterrupted predetermined period of time, such as 15 minutes. If vehicle motion occurs while in INTERIM mode, the TCM sensor 20 returns to the mode from which the INTERIM mode was entered, either the DRIVE or LOCALIZE mode.

In each mode, the TCM sensor 20 collects data and transmits a tire condition (TC) message according to Table 1. Thus, for example, when in the DRIVE mode, the TCM sensor 20 measures and stores pressure every sixteen seconds and transmits that tire pressure and temperature to the TCM controller 32 every 64 seconds. The TCM controller 32 receives the transmitted pressure and temperature data, assigns the data to the tire location corresponding to the sensor ID, and updates any applicable vehicle systems and displays.

While in the DRIVE mode, the TCM sensor 20 compares the current pressure measurement to the previously stored pressure measurement. If the difference between the current and last measured pressures exceeds a predetermined value, such as 1.2 psi, the pressure is transmitted immediately to the TCM controller 32 so that the TCM system 10 can be updated and the vehicle operator can be alerted to the change in pressure. According to the invention, the TPM system 10 is configured to implement a tire fill assist (TFA) mode in response to determining a condition in which the vehicle operator may be inflating or deflating the tire. Since the vehicle operator can only inflate/deflate the tires when the vehicle is stopped, the TFA mode is available only when the TCM sensors 20 are in either the INTERIM mode or PARK mode. In the example embodiment described herein, the TCM sensors 20 determine that a tire fill may be occurring and, in response, set a tire fill request (TFR) flag in the transmitted tire condition message. In response to receiving a TFR message from the sensors 20, the TCM controller 32 may enter the TFA mode and instructs the vehicle operator in inflating the tires, if the TCM controller 32 determines that an operator is actually inflating or deflating a tire, and that the TFR flag wasn't just a temperature change induced pressure change (for example tire heating or cooling).

Referring to Table 1, in the INTERIM and PARK modes, the TCM sensors 20 measure tire pressure every 2 seconds in order to facilitate fast entry into the TFA mode for feedback to the vehicle operator. The TCM sensors 20 transmit a tire condition message only in response to detecting a predetermined change in pressure. While in the INTERIM or PARK mode, the TCM sensor operates according to the process illustrated in FIG. 3.

Figure 3:
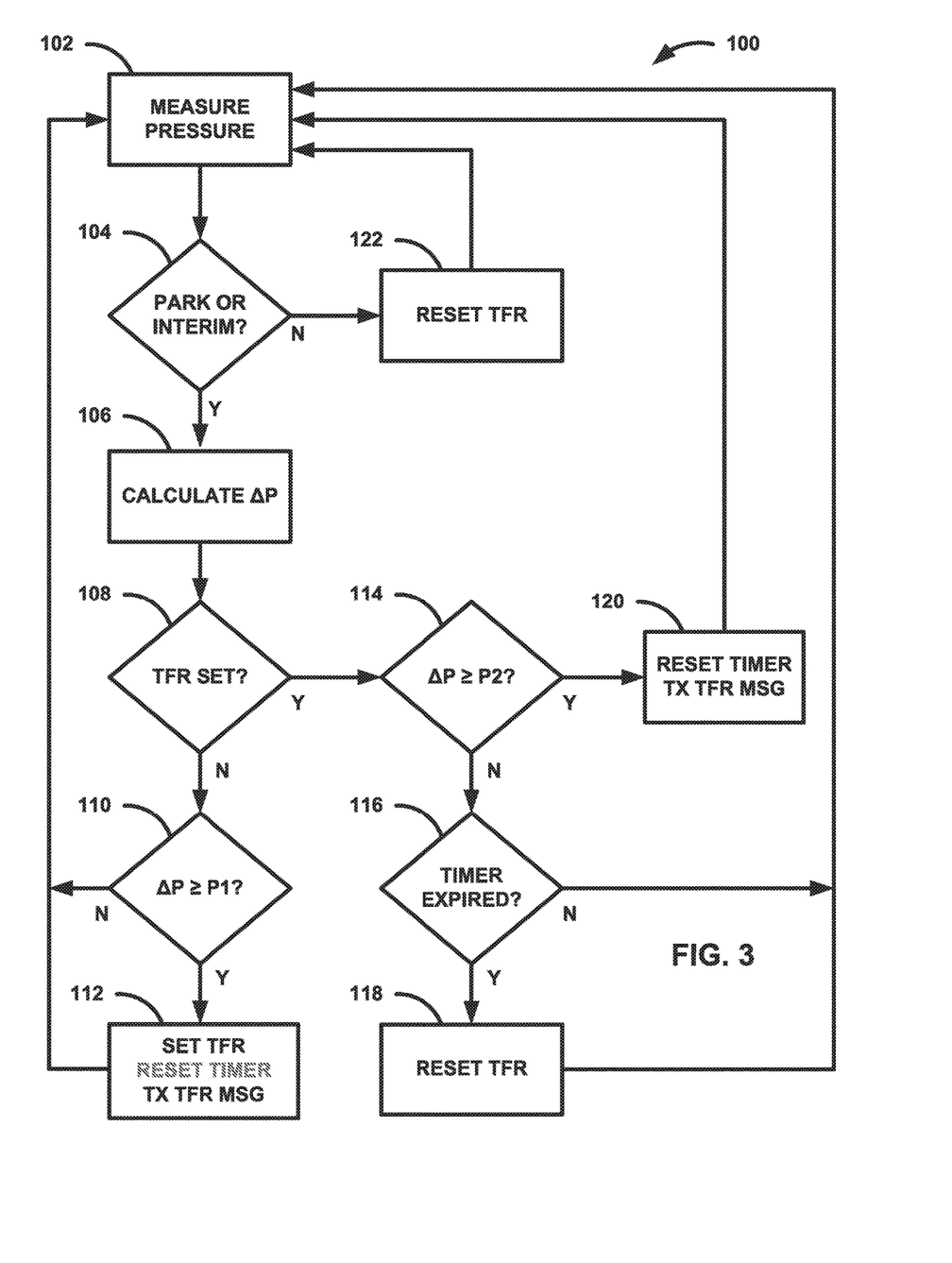
FIG. 3 is a flow chart depicting a control process that can be implemented by the tire condition monitoring system of FIG. 1, according to an example embodiment of the invention.

FIG. 3 illustrates a TFM process 100 implemented by the TCM sensor 20 every time the sensor measures pressure in the tire. The TFM process 100 begins at 102 and proceeds to step 104, where a determination is made as to whether the TCM sensor 20 is in the PARK or INTERIM mode. If the TCM sensor 20 is not in the PARK or INTERIM mode, the process 100 proceeds to step 122, where the TFR flag is reset (TFR=0) and the process returns to step 102 for the next pressure measurement. If, at step 104, the TCM sensor 20 is in the PARK or INTERIM mode, the process 100 proceeds to step 106, where ΔP is calculated as the absolute value of the difference between the measured pressure ($P_{meas}$) and the last transmitted pressure ($P_{stored}$) according to:

$$\Delta P = abs[P_{meas} - P_{stored}]$$

The process 100 then proceeds to step 108, where a determination is made as to whether the TFR flag is set (TFR=1). If the TFR flag is not set, the process 100 proceeds to step 110, where a determination is made as to whether ΔP is greater than a predetermined pressure value (P1) selected to indicate that the operator may be inflating or deflating the tire, such as ≥1.2 psi. If ΔP is not greater than this threshold P1, the process 100 returns to step 102 for the next pressure measurement.

If, at step 110, it is determined that ΔP is greater than the predetermined value (e.g., ≥1.2 psi), the process 100 proceeds to step 112, where the TFR flag is set (TFR=1) and a tire condition message is transmitted to the TCM controller 32. Additionally, at step 112, a TFR timer (e.g., 24 seconds) is initiated and the pressure measurement rate ($P_{rate}$) is increased (e.g., to one second instead of two). The transmitted tire condition message includes the measured pressure, temperature, and TFR flag. The TCM sensor 20 updates $P_{stored}$ after every transmitted tire condition message. The process 100 returns to step 102 for the next pressure measurement at the increased pressure measurement rate.

If, at step 108, the TFR flag is already set (indicating that the sensor is already in the TFR mode), the process 100 proceeds to step 114, where a determination is made as to whether ΔP is greater than a second predetermined value (P2) selected to provide further indication/confirmation that the operator is still inflating or deflating the tire. Since the TFR flag has already been set and $P_{rate}$ rate was increased (to one second), the second predetermined value for ΔP can be less than the first value (P2<P1), such as ≥8 psi. If ΔP is not greater than this threshold P2, the process 100 determines at step 116 whether the TFR timer has expired. If the timer has expired as in the case the vehicle operator stops adjusting the tire pressure, the TFR flag is reset at step 118 and the pressure measurement rate is set back to the non TFM rate (e.g., 2 seconds). The process then to step 102 for the next pressure measurement.

If, at step 114, it is determined that ΔP is greater than the second value (e.g., ≥0.8 psi), the process 100 proceeds to step 120, where the TFR timer re-started and the TFR message is transmitted to the TCM controller 32. The TCM sensor 20 updates $P_{stored}$. The process 100 returns to step 102 for the next pressure measurement at the increased pressure measurement rate.

TFA Mode Determination

According to the invention, the TCM system 10 determines whether to enter the TFA mode by using the ideal gas law to detect whether air is being added to or removed from the tire and not just a pressure change due to a temperature change. As described herein, a change in the number of moles or mass of the air in any given tire is functionally related to a simplified form of the ideal gas law. Thus, an increase in air mass, i.e., an increase in the number of moles, indicates tire inflation, and a decrease in air mass, i.e., a decrease in the number of moles, indicates tire deflation. In this manner, the TCM system 10 can detect the tire fill condition and enter the TFA mode in order to assist the operator accordingly.

Equation 1 illustrates the functional equivalence that the TCM system 10 implements to provide tire fill assist functionality:

$$\Delta n = \frac{P_{stored}}{T_{stored}} - \frac{P_{meas}}{T_{meas}} \qquad \text{(Equation 1)}$$

In equation 1, Δn represents the change in the number of moles of air in any particular tire as it is functionally related to previously stored and currently measured values of pressure and temperature. It should be noted here that Equation 1 represents a functional relationship between the mass or number of moles of air in a tire and changes in the pressure and temperature of the air in the tire. In this equation, $P_{meas}$ is the current measured pressure reading, $P_{stored}$ is the pressure reading stored previously, $T_{meas}$ is the current temperature reading, and $T_{stored}$ is the temperature reading stored previously.

Equation 1 employs a simplified form of the ideal gas law. The ideal gas law is PV=nRT, where P is pressure, V is volume, n is the number of moles of gas, R is the ideal gas constant functionally related to Boltzmann's constant and Avogadro's constant, and T is the temperature above absolute zero (i.e., above 0 degrees Kelvin). For a given radial tire on a rim, the volume of the tire is substantially constant over a wide range of temperatures and pressures. Since V can be assumed constant (true for a radial tire) and R is by definition a constant, the ideal gas law reduces to simplified form in which the number of moles, n, is functionally related to pressure and temperature according to n=P/T. While the value of n is not a direct measurement of the moles of air in the tire per se, it is functionally related to the moles of air in the tire such that an increase or decrease in this value is in direct proportion to a corresponding increase or decrease in the moles of air in the tire.

The calculation of Equation 1 can be performed by any component of the TCM system 10, e.g., by the TCM controller 32, by the TCM sensor 20, or by a combination of these components. In the example embodiment, as described below, the determination is performed by the TCM controller 32. The implementation of the TFA mode determination according to the invention is by no means limited to this example, as the determination can be implemented by the TCM sensor 20.

TCM Controller TFA State Operation

When the TCM controller 32 receives a tire condition message with a TFR flag set (referred to herein as a TFR message) under vehicle conditions where TFA mode is permitted, such as speed=zero, vehicle is in PARK (automatic transmission), parking brake engaged (manual transmission), and ignition ON (ACC or RUN), the controller assigns a TFA pending state to that TCM sensor 20. The controller 32 then performs the calculation of Equation 1, using stored pressure and temperature values from the last received, non-TFA mode, tire condition message from that sensor for $P_{stored}$ and $T_{stored}$. The pressure and temperature values received in the TFR message are used for $P_{meas}$ and $T_{meas}$ in Equation 1. The TCM controller 32 calculates Δn and, if the calculation indicates an increase or decrease in the number of moles/mass of the air in the tire that exceeds a predetermined value, the TCM controller 32 enters the TFA mode for that TCM sensor 20. The predetermined value for the number of moles can be a value that is related to a change commensurate with a predetermined change in tire pressure, such as about 2.67 kPa or 1.2 psi.

If the calculation of Δn does not meet or exceed the predetermined increase/decrease value, the TCM controller maintains the TFA pending flag for that sensor and awaits the next tire condition message from that sensor. Upon receiving the next TFR message from that sensor, the TCM controller 32 re-calculates Δn, again using stored pressure and temperature values from the last received, non-TFA mode, tire condition message from that sensor for $P_{stored}$ and $T_{stored}$, but using the newly received values for $P_{meas}$ and $T_{meas}$. If this re-calculated Δn indicates a tire fill event, the TCM controller 32 enters the TFA mode for that TCM sensor 20. If not, the TCM controller 32 maintains the TFA pending state for that sensor 20 and awaits another transmission. This cycle continues until one of the following occurs:

The controller enters the TFA mode for the sensor.
Vehicle conditions (such as speed≠zero) cancel the TFA mode.
The sensor is no longer sending TFR messages (i.e. sensor is in DRIVE mode)
Another sensor enters the TFA mode.

Multiple tires can transmit TFR messages at the same time. This can occur, for example, when pressure increases rapidly due to an increase in temperature, such as when a vehicle comes to rest and heat from the engine and brakes heats the air in the tire. Thus, the TCM controller 32 can assign a TFA pending state to multiple tires/sensors simultaneously. When this occurs, if the TCM controller 32 determines via Equation 1 that a pressure increase is due to a tire fill event and enters the TFA mode for the first tire/sensor that satisfies the condition. When the TCM controller 32 enters the TFA mode for any one tire/sensor 20, the controller holds all other tires/sensors currently in the TFA pending are in the TFA pending state until the controller exits the TFA mode. The TCM controller 32 remains in the TFA mode and assists the vehicle operator to fill the TCM sensor 20 until one of the following occurs:

Vehicle conditions (such as speed≠0) cancels the TFA mode
The sensor is no longer sending TFR messages (i.e. sensor is in RIVE mode)
No new TFR messages from the TCM sensor 20 being assisted for a predetermined short time (e.g. 5 seconds) AND another TCM sensor 20 in TFA pending qualifies for TFA
No new TRF messages from the TCM sensor 20 being assisted for a predetermined long period of time (e.g. 30 sec)

Tire Fill Assist Process

Figure 4:
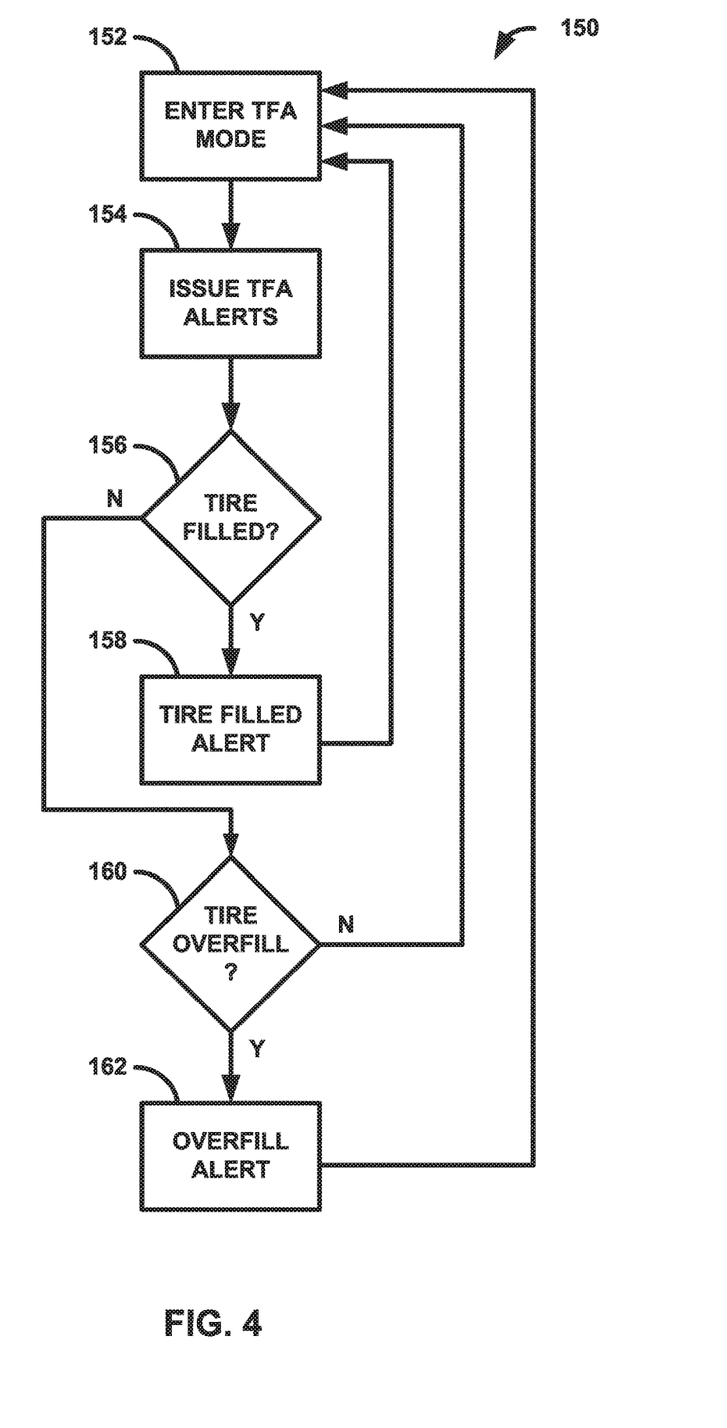
FIG. 4 is another flow chart depicting a control process that can be implemented by the tire condition monitoring system of FIG. 1, according to the example embodiment of the invention.

When the TCM controller 32 enters the TFA mode for a tire/sensor, the TCM system implements a process that provides indications to the operator that are intended to assist in the tire inflation/deflation process. The TFA process 150 implemented by the TCM system 10 in general, and by the TCM controller 32 more specifically, is illustrated in FIG. 4. Referring to FIG. 4, the process 150 begins when the controller enters the TFA mode for the sensor at step 152 and proceeds to step 154, where the TCM controller 32 begins sending alerts to the vehicle operator indicating that the TFA mode has been entered. The TFA mode alerts can be visual, audible, or both visual and audible. In one example, the TFA mode alert includes flashing the vehicle hazard lights for the duration of the TFA mode and for a period of time (e.g., 30 seconds) after receiving each TFR message from the sensor 20.

The process 150 then proceeds to step 156, where the pressure value $P_{meas}$ received in the TFM message is compared to a predetermined value, such as a placard pressure dictated by the vehicle manufacturer. The TCM controller 32 can compensate the measured pressure $P_{meas}$ to take into account atmospheric pressure and other conditions, as known in the art.

If, at step 156, it is determined that placard pressure has been achieved within some minor tolerance, the process 150 proceeds to step 158, and a tire filled alert is issued. The tire filled alert can be visual, audible, or a combination of both visual and audible. In one example, the tire filled alert issued at step 158 can be a single horn chirp. From step 158, process 150 proceeds back to step 152 and waits for the next pressure reading via TFR message, and proceeds as described above through steps 154 and 156. The TCM controller 32 thus continues to send the audible/visual TFA mode alerts to the operator. If, at step 156, it is determined that placard pressure has not been achieved, the process 150 proceeds to step 160.

where a determination is made as to whether the tire is over or under filled, (e.g. placard pressure has been exceeded by a predetermined amount, such as by +/−10%). If the tire associated with the sensor 20 under TFA is not yet over or under filled, the process 150 reverts back to step 152 and proceeds from there as described above. If the tire associated with the sensor 20 under TFA has been over or under filled, the process 150 proceeds to step 162, and a tire over/under fill alert is issued and then back to step 152 This alert can visual, audible, or a combination of both visual and audible. In one example, the over/under fill alert can be double horn chirps issued at predetermined intervals, such as every 2-3 seconds, while tire pressure continues to increase beyond the predetermined amount.

From the above description of the invention, those skilled in the art will perceive improvements, changes and modifications. Such improvements, changes and modifications within the skill of the art are intended to be covered by the appended claims.

Having described the invention, the following is claimed:
1. A tire condition monitoring apparatus comprising:
a tire-based sensor configured to sense tire operating conditions and transmit a tire condition signal including the sensed tire operating conditions; and
a vehicle-based controller configured to receive the tire condition signal and monitor the tire operating conditions, wherein at least one of the sensor and the controller are configured to:
determine that a tire pressure adjustment condition exists in response to determining, based on the sensed operating conditions, that a predetermined change in the number of moles of air in the tire has taken place.

2. The apparatus recited in claim 1, wherein the tire operating conditions in the transmitted tire condition signal comprise the sensed pressure and temperature of the air in the tire.

3. The apparatus recited in claim 1, wherein the controller is configured to enter a tire fill assist mode in response to determining that a tire pressure adjustment condition exists.

4. The apparatus recited in claim 3, wherein the controller, when in the tire fill assist mode, is configured to provide at least one of visual and audible alerts indicating at least one of the following conditions: that the controller is in the tire fill assist mode, that tire pressure is less than a predetermined pressure, that tire pressure is equal to the predetermined pressure, and that tire pressure exceeds the predetermined pressure.

5. The apparatus recited in claim 4, wherein the predetermined pressure is a vehicle placard pressure determined by the vehicle manufacturer.

6. The apparatus recited in claim 4, wherein the alerts comprise at least one of a vehicle horn chirp, a vehicle light flash, a vehicle instrument panel indication, and a vehicle center console indication.

7. The apparatus recited in claim 1, wherein the sensor is configured to measure pressure in the tire and enter a tire fill request mode in response to determining a predetermined change in the measured pressure within a predetermined time.

8. The apparatus recited in claim 1, wherein the sensor is configured to measure pressure in the tire and enter a tire fill request mode in response to determining a predetermined change in the measured pressure since the last transmitted pressure value.

9. The apparatus recited in claim 8, wherein the predetermined change in pressure is +/−0.8-1.2 psi and the predetermined time is 1-3 seconds.

10. The apparatus recited in claim 8, wherein the sensor is configured to include in the tire condition signal a tire fill request and the controller is configured to determine whether the change in the number of moles of air has occurred in response to receiving a tire condition message that includes the tire fill request indication.

11. The apparatus recited in claim 1, wherein the sensor is configured to determine whether the pressure adjustment condition exists.

12. The apparatus recited in claim 1, wherein the determination that a tire pressure adjustment condition exists is blocked unless predetermined vehicle conditions exist, the vehicle conditions comprising: the vehicle being stopped, the vehicle ignition being on, the vehicle transmission being in park in the case of an automatic transmission, and the vehicle parking brake being engaged in the case of a manual transmission.

13. The apparatus recited in claim 1, wherein the determination that a predetermined change in the number of moles of air in the tire has taken place is functionally related to:

$$\frac{P_{stored}}{T_{stored}} - \frac{P_{meas}}{T_{meas}},$$

where $P_{stored}$ is a previously stored tire air pressure, $T_{stored}$ is a previously stored tire air temperature, $P_{meas}$ is the sensed pressure of the air in the tire, and $T_{meas}$ is the sensed temperature of the air in the tire previously stored tire air temperature.

14. A method for monitoring vehicle tire conditions with a tire condition monitoring system including a tire-based sensor and a vehicle based controller, the method comprising:

sensing, via the sensor, tire operating conditions;

transmitting, via the sensor, a signal including the sensed tire operating conditions;

receiving the signal via the controller;

determining that a tire pressure adjustment condition exists in response to determining, based on the sensed operating conditions, that a predetermined change in the number of moles of air in the tire has taken place.

15. The method recited in claim 14, wherein the tire conditions in the transmitted signal comprise the sensed pressure and temperature of the air in the tire.

16. The method recited in claim 14, further comprising the step of the controller entering a tire fill assist mode in response to the determination that a tire pressure adjustment condition exists.

17. The method recited in claim 16, further comprising providing at least one of visual and audible alerts, via the controller when in the tire fill assist mode, indicating at least one of the following conditions: that the controller is in the tire fill assist mode, that tire pressure is less than a predetermined pressure, that tire pressure is equal to the predetermined pressure, and that tire pressure exceeds the predetermined pressure.

18. The method recited in claim 17, wherein the predetermined pressure is a vehicle placard pressure determined by the vehicle manufacturer.

19. The method recited in claim 17, wherein the at least one of a visual and audible alerts comprise at least one of a vehicle horn chirp, a vehicle light flash, a vehicle instrument panel indication, and a vehicle center console indication.

20. The method recited in claim 14, further comprising measuring via the sensor a pressure in the tire, the sensor being configured to enter a tire fill request mode in response to determining a predetermined change in the measured pressure since the last transmitted value.

21. The method recited in claim 14, further comprising measuring via the sensor a pressure in the tire, the sensor being configured to enter a tire fill request mode in response to determining a predetermined change in the measured pressure within a predetermined time.

22. The method recited in claim 14, wherein the predetermined change in pressure is +/−0.8-2.0 psi and the predetermined time is 1-3 seconds.

23. The method recited in claim 14, wherein the sensor is configured to include in the tire condition signal a tire fill request, the method further comprising determining via the controller whether the change in the number of moles of air has occurred in response to receiving a tire condition message that includes the tire fill request.

24. The method recited in claim 14, wherein determining that a tire pressure adjustment condition exists is predicated on determining that predetermined vehicle conditions exist, the vehicle conditions comprising: the vehicle being stopped, the vehicle ignition being on, the vehicle transmission being in park in the case of an automatic transmission, and the vehicle parking brake being engaged in the case of a manual transmission.

25. The method recited in claim 15, wherein determining the change in the number of moles comprises making a determination in which the number of moles is functionally related to:

$$\frac{P_{stored}}{T_{stored}} - \frac{P_{meas}}{T_{meas}},$$

where $P_{stored}$ is a previously stored tire air pressure, $T_{stored}$ is a previously stored tire air temperature, $P_{meas}$ is the sensed pressure of the air in the tire, and $T_{meas}$ is the sensed temperature of the air in the tire previously stored tire air temperature.

26. The method recited in claim 15, wherein determining whether the pressure adjustment condition exists is performed by the sensor.

27. The method recited in claim 15, wherein determining whether the pressure adjustment condition exists is performed by the controller.

* * * * *